United States Patent [19]
Iwao et al.

[11] Patent Number: 6,082,489
[45] Date of Patent: Jul. 4, 2000

[54] SOUND ISOLATION PLATE STRUCTURE

[75] Inventors: Keijiro Iwao; Yuji Shimpo, both of Kanagawa-ken, Japan

[73] Assignee: Nissan Motor Co., Ltd., Kanagawa-ken, Japan

[21] Appl. No.: 09/038,502

[22] Filed: Mar. 9, 1998

[30] Foreign Application Priority Data

Mar. 7, 1997 [JP] Japan ..................... 9-053351

[51] Int. Cl.[7] ................................. F01N 1/08
[52] U.S. Cl. ................... 181/286; 181/290; 181/292
[58] Field of Search ........................ 181/208, 284, 181/286, 288, 290, 292, 293, 294, 295

[56] References Cited

U.S. PATENT DOCUMENTS

| | | | |
|---|---|---|---|
| 3,910,374 | 10/1975 | Holehouse | 181/290 |
| 4,231,447 | 11/1980 | Chapman | 181/286 |
| 4,310,068 | 1/1982 | Erskine | 181/290 |

FOREIGN PATENT DOCUMENTS

| | | | |
|---|---|---|---|
| 7-13573 | 1/1995 | Japan . | |
| 2276224 | 9/1994 | United Kingdom | 181/290 |

*Primary Examiner*—Khanh Dang
*Attorney, Agent, or Firm*—McDermott, Will & Emery

[57] ABSTRACT

A sound isolation plate structure comprises a sheet of perforated board in which a plurality of holes are formed, and cylindrical portions provided on one surface side of the perforated board to extend from peripheral portions of the holes like cylinders unilaterally, wherein pneumatic vibration systems are formed between the cylindrical portions. Accordingly, a resonance frequency of vibration systems is easily tuned by adjusting a projection amount of the cylindrical portions so as to mate with a frequency of the noise to be isolated.

18 Claims, 8 Drawing Sheets

SOUND ISOLATION PLATE STRUCTURE

The contents of Application No. TOKUGANHEI 9-53351, filed on Mar. 7, 1997 in Japan on which the content and claim for priority of the instant application are based, are hereby incorporated by reference.

BACKGROUND OF THE INVENTION

The present invention relates to a sound isolation plate, for example, an under cover provided on the bottom of the engine room to reduce the noise on the outside of the car, which is capable of meeting compatibility between a sound isolation property to reduce noises and an air permeability to radiate heat from the engine room.

As shown in FIG. 1, the under cover 3 is fitted on the bottom of the engine room 2 of the common car 1. This under cover 3 prevents an oil pan of the engine, etc. from directly striking against protruded things on the road. Also, the under cover 3 functions as a sound isolation wall to suppress an engine noise which is radiated from the engine room 2 to the outside of the car.

A fitting area of the under cover 3 wider, a sound isolation effect achieved by the under cover 3 higher. However, if the fitting area of the under cover 3 is increased, a sealing degree of the engine room 2 is enhanced by such under cover 3 and thus the air permeability of the engine room 2 is lowered. It is likely that an increase in an atmospheric temperature of the engine room 2 is caused. Therefore, in practice the air permeability must be assured on a preferential basis. As a result, a limitation is imposed on an improvement in the sound isolation effect by virtue of an increase of the fitting area of the under cover 3.

SUMMARY OF THE INVENTION

The present invention has been made in view of the above problems and it is an object of the present invention to provide a sound isolation plate structure which is capable of improving both an air permeability and a sound isolation property.

It is another object of the present invention to provide a sound isolation plate structure which has a simple structure and is capable of doing simply the frequency characteristic tuning.

According to an aspect of the present invention, there is provided a sound isolation plate structure comprising:

a sheet of perforated board in which a plurality of holes are formed; and cylindrical portions provided on one surface side of the perforated board to extend from peripheral portions of the holes unilaterally like cylinders;

wherein pneumatic vibration systems are formed between the cylindrical portions.

With the above configuration, because the pneumatic vibration systems formed between the plurality of cylindrical portions act as the dynamic damper against the transmitted wave through the holes, the antiresonance is given to the vibration response of the transmitted wave. Therefore, the transmission loss is increased and thus a noise level is reduced.

In addition, good air permeability is obtained because of the plurality of holes.

Therefore, both the air permeability and the sound isolation property are improved.

Besides, the frequency characteristic of transmission loss of the sound isolation plate is adjusted arbitrarily by changing the projection amount of the cylindrical portions, i.e., the effective hole length of the holes. Hence, the frequency characteristic of transmission loss of the sound isolation plate is tuned easily and properly so as to mate with all sound isolation needs.

Also, a thickness t of the perforated board and an effective hole length L of the cylindrical portion may be set such that the thickness t of the perforated board, the effective hole length L of the cylindrical portion, an acoustic velocity C, and a center frequency f1 in a frequency bandwidth of a noise to be isolated may satisfy a relationship $L-t=C/4f1$.

Also, a thickness t of the perforated board and an effective hole length L of the cylindrical portion may be set such that the thickness t of the perforated board, the effective hole length L of the cylindrical portion, an acoustic velocity C, and a peak frequency f2 of a noise to be isolated may satisfy a relationship $L-t=C/4f2$.

With the above configuration, the noise having a frequency for purpose of shielding the noise is precisely isolated, so that a sound isolation effect is extremely improved.

In addition, a porous material may be filled between the cylindrical portions.

With the above configuration, the frequency characteristic of transmission loss of the sound isolation plate is more easily tuned by changing a filling density or a filling thickness of the porous material.

Besides, a peak frequency of transmission loss which is changed according to a filling density and a filling thickness of the porous material may be set to substantially mate with the center frequency or the peak frequency in the frequency bandwidth of the noise to be isolated.

With the above configuration, the noise having a frequency for purpose of shielding the noise is precisely isolated, so that a sound isolation effect is extremely improved.

Further, one surface side of the perforated board from which the porous material is exposed may be arranged to direct toward a noise generating source side.

With the above configuration, a noise absorbing effect is obtained by the porous material, and also the noise level of the sound isolation plate on the noise generating source side is reduced simultaneously. For this reason, the sound isolation effect is much more improved.

According to another aspect of the present invention, there is provided a sound isolation plate structure comprising:

two sheets of perforated boards in which a plurality of holes are formed respectively and which are arranged at a predetermined interval such that the holes are opposed to each other; and cylindrical portions formed by connecting peripheral portions of the holes on both perforated boards mutually so as to form continuous hole portions therein;

opening portions provided on one of the perforated boards so as to connect air chambers formed within the cylindrical portions to an external space;

wherein pneumatic vibration systems are formed between the cylindrical portions.

With the above configuration, since the pneumatic vibration systems formed between the plurality of cylindrical portions act as the dynamic damper against the transmitted wave through the continuous holes, the antiresonance is given to the vibration response of the transmitted wave. Therefore, the transmission loss is increased and thus the noise level is reduced.

In addition, good air permeability is obtained because of the plurality of continuous holes.

Therefore, both the air permeability and the sound isolation property is improved.

Besides, the frequency characteristic of transmission loss of the sound isolation plate is adjusted arbitrarily by changing any of a diameter of the opening portion of the air chamber, a rate of hole area of the opening portion, a depth of the opening portion, a total thickness of the sound isolation plate, and a height of the air chamber. Hence, the frequency characteristic of transmission loss of the sound isolation plate is tuned easily and properly so as to mate with all sound isolation needs.

Moreover, the center frequency or the peak frequency of the frequency bandwidth of the noise to be isolated may be set to coincide substantially with a peak frequency of transmission loss which is changed according to the diameter of the opening portion of the air chamber, the rate of hole area of the opening portion, the depth of the opening portion, the total thickness of the sound isolation plate, and the height of the air chamber.

With above configuration, the noise having a frequency for purpose of shielding the noise is precisely isolated, so that a sound isolation effect is extremely improved.

In addition, a porous material may be filled into the air chamber.

With the above configuration, the frequency characteristic of transmission loss of the sound isolation plate is tuned by changing a filling density or a filling thickness of the porous material. Hence, tuning of the frequency characteristic is be accomplished more easily.

Moreover, one of the perforated boards on which the opening portions to expose the porous material are provided may be arranged so as to direct toward a noise generating source.

With the above configuration, the noise absorbing effect is obtained by the porous material, and also the noise level of the sound isolation plate on the noise generating source side is reduced simultaneously. As a result, the sound isolation effect is much more improved.

DESCRIPTION OF THE PREFERRED EMBODIMENTS

Embodiments of the present invention will be explained in detail with reference to the accompanying drawings hereinafter.

First Embodiment

Figure 2:
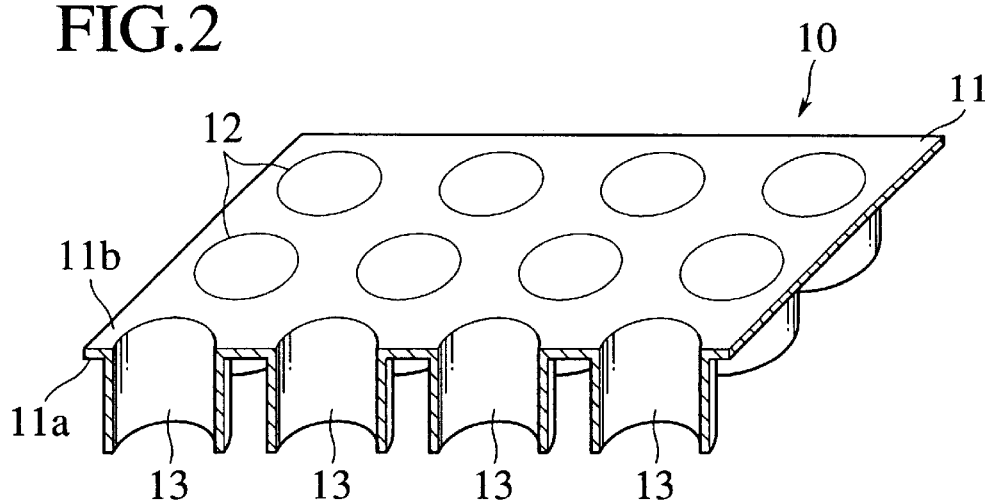
FIG. 2 is a perspective view showing a sound isolation plate structure according to a first embodiment of the present invention.
Figure 3:
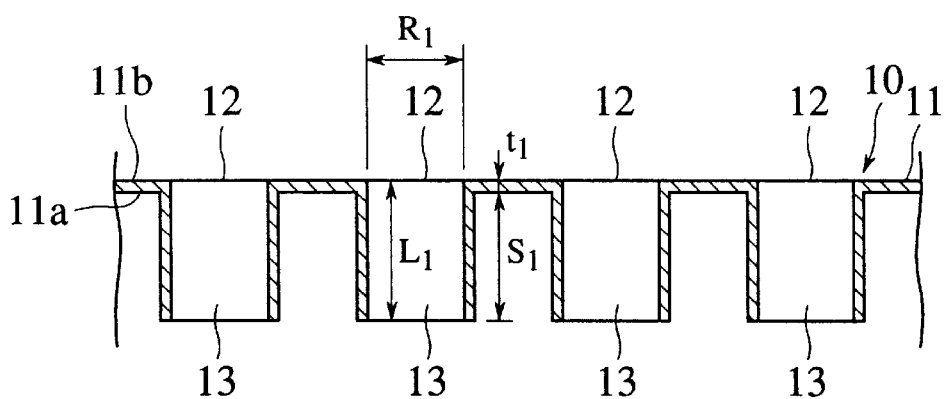
FIG. 3 is a sectional view showing a sectional shape of the sound isolation plate structure shown in FIG. 2.

As shown in FIGS. 2 and 3, a sound isolation plate 10 comprises a perforated flat board 11 which is made of resin and has a predetermined thickness t1. A plurality of holes 12 are provided in the perforated board 11. All holes 12 are formed as circular holes each having a diameter R1. Because of the holes 12, the perforated board 11 has a rate of hole area α1.

Cylindrical portions or tubes 13 are provided as many as the holes 12 on one surface 11a side of the perforated board 11. The cylindrical portions 13 are formed to extend, like pipes, from peripheral areas of the holes 12 unilaterally respectively. All projection heights of the cylindrical portions 13 viz., the length of the tubes; and from the perforated board 11 are set to the same (projection amount S1). Inner surfaces of the holes 12 and inner surfaces of the cylindrical portions 13 are connected to form coplanar circular surfaces respectively. Cylindrical internal spaces which continue from one surface 11a side of the perforated board 11 to the other surface 11b thereof are partitioned with the holes 12 and the cylindrical portions 13.

Figure 4:
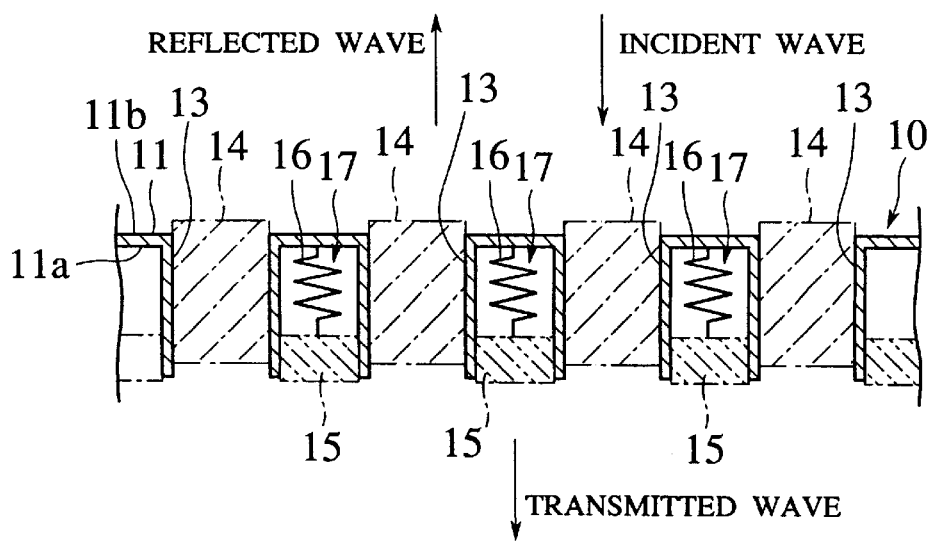
FIG. 4 is a sectional view showing a sound isolation mechanism of the sound isolation plate structure shown in FIG. 2.

FIG. 4 is a sectional view showing a sound isolation mechanism of the sound isolation plate 10 shown in FIG. 2.

Air layers included in the internal spaces which are partitioned with the holes 12 and the cylindrical portions 13 serve as pneumatic masses 14 respectively. In addition, the other air layers each having a thickness S1 which is equal to the projection height of the cylindrical portion 13 are formed between neighboring cylindrical portions 13, 13.

Since air has mass and acts as an elastic body, pneumatic vibration systems 17 are formed between the cylindrical portions 13, 13 respectively. Each of such pneumatic vibration systems 17 consists of a pneumatic mass 15 made up of an air layer between edge portions of the cylindrical portions 13, 13, and an air spring 16 made up of an air layer which is located below the (perforated flat board 11) than adjacent the cylindrical portions or tubes 13, 13.

These pneumatic vibration systems 17 act as dynamic dampers against the transmitted wave transmitted via the cylindrical portions 13 of the sound isolation plate 10 to thus provide antiresonance to a vibration response of the transmitted wave. Hence, transmission loss is improved and a noise level is reduced.

Figure 1:
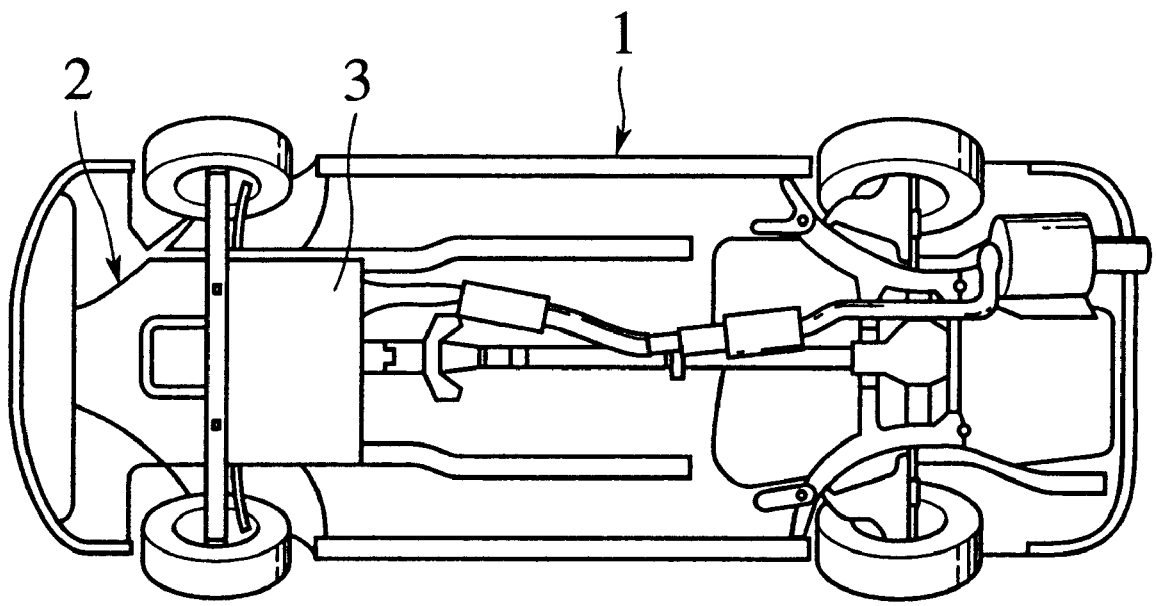
FIG. 1 is a bottom view showing a car having an under cover in the prior art.

For this reason, if the sound isolation plate 10 constructed as above is employed as the under cover 3 which is provided on the bottom of the engine room 2 of the car 1 shown in FIG. 1, good air permeability is accomplished via the holes 12, so that heat is discharged smoothly from the engine room to the outside. Further, because of the dynamic damper action of the pneumatic vibration systems 17 formed between the cylindrical portions 13, 13, the antiresonance is given to the vibration response of the transmitted wave of the noise passing through the under cover 3 from the engine room 2 to thus increase the transmission loss. Therefore, a level of noise which is radiated from the engine room 2 to the outside of the car 1 is reduced. As a result, the compatibility between an improvement in cooling capability and noise suppression in the engine room 2 is attained.

In this case, the pneumatic vibration systems 17 formed between the cylindrical portions 13, 13 act as the dynamic dampers against the transmitted wave passing through these cylindrical portions 13, 13. Therefore, even if the cylindrical portions 13 are aligned toward the transmitted wave side on the outside of the car, for example, as shown in FIG. 4, or conversely the cylindrical portions 13 are aligned toward the incident wave side in the engine room 2, the similar sound isolation effect is achieved by the sound isolation plate 10.

In the first embodiment, since an effective hole length L1 of the cylindrical portion 13 corresponds to a length of the internal space which is partitioned with the holes 12 and the cylindrical portions 13, such effective hole length L1 is given as $$L1 = t1 + S1 \quad (1)$$

by use of the thickness t1 of the perforated board 11 and the projection amount S1 of the cylindrical portion 13.

Among the projection amount S1 of the cylindrical portion 13, a resonance frequency f0 of the pneumatic-vibration system 17, and an acoustic velocity C, a relationship $$f0 = C \times (2n-1)/4S1 \quad (2)$$

is found. Where n is a natural number in Eq. (2). When n=1, the lowest resonance frequency f0m out of the resonance frequencies f0 is detected. Then, $$f0m = C/4S1 \quad (3)$$

is derived by substituting n=1 and f0=f0m into Eq. (2).

Figure 6:
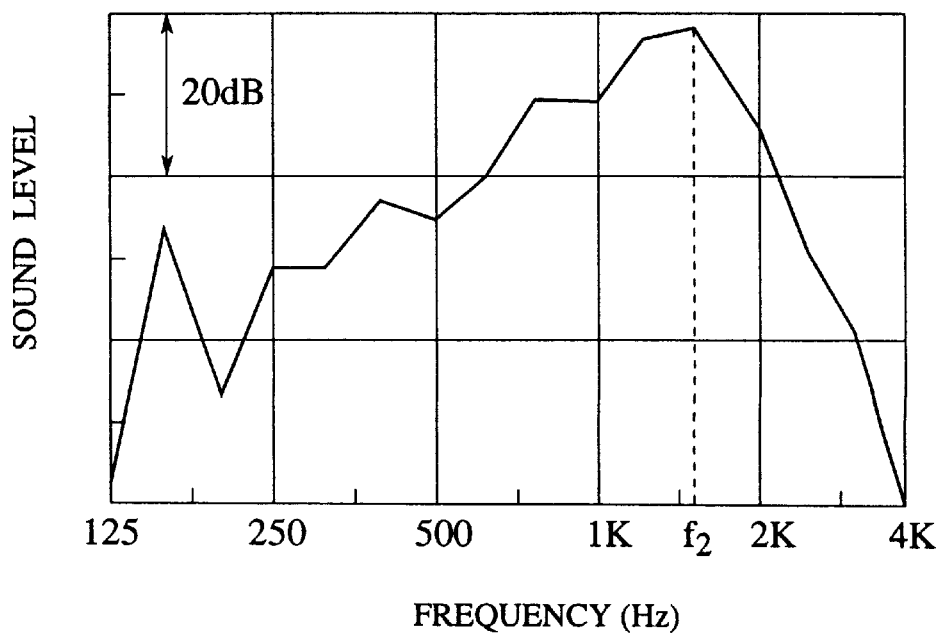
FIG. 6 is a characteristic view showing an example of noise frequency obtained by the sound isolation plate structure shown in FIG. 2.

Meanwhile, as shown in FIG. 6, for example, the engine noise of the car has a peak at a predetermined value (peak frequency f2).

Therefore, it should be noted that, if the noise of the peak frequency f2 is isolated, most effective noise suppression is implemented. More particularly, a resonance frequency f0 (minimum resonance frequency f0m) should be put into coincidence with a peak frequency f2 of the noise to be isolated.

In other words, by substituting f0m=f2 into Eq. (3), $$S1 = C/4f2 \quad (4)$$

is derived. Then, if an acoustic velocity C and the peak frequency f2 are substituted into Eq(4), the desired projection amount S1 is obtained.

Then, substitution of Eq. (4) into Eq. (1) gives $$L1 - t1 = C/4f2 \quad (5)$$

For example, as shown in FIG. 6, if the peak frequency f2 of the engine noise to be isolated is in the neighboring of 1700 Hz, the projection amount S1 of the cylindrical portions 13 is calculated as 50 mm by substituting the acoustic velocity C=340 m/sec and the peak frequency f2=1700 Hz into Eq. (4).

Figure 5:
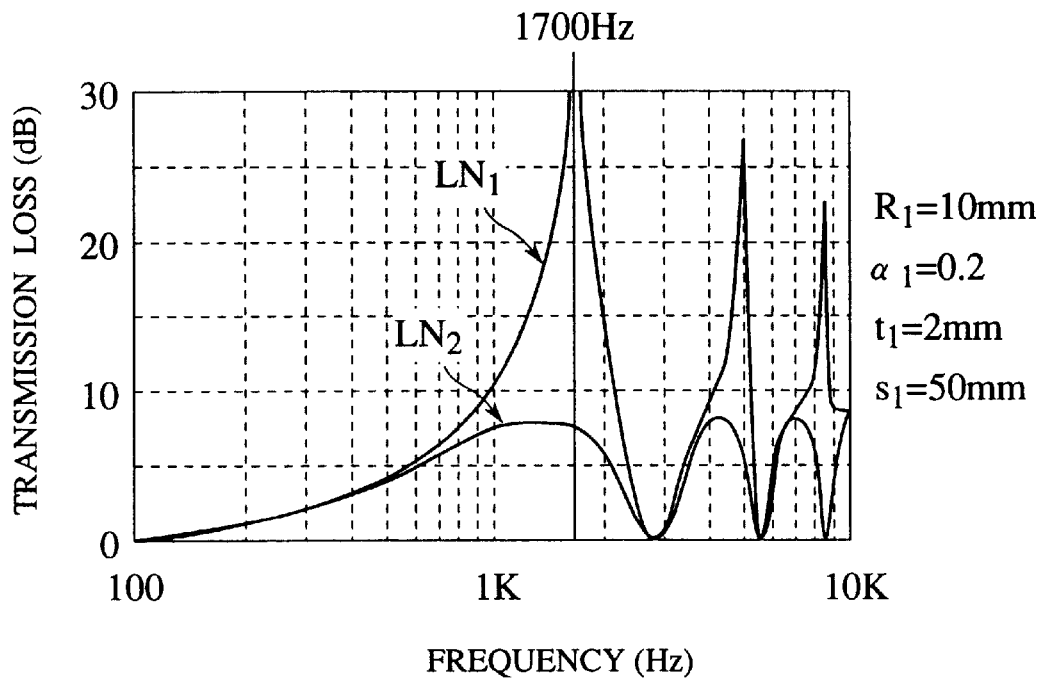
FIG. 5 is a graph showing a frequency characteristic of the sound isolation plate structure shown in FIG. 2.

In the event that the cylindrical portions 13 having the projection amount S1=50 mm calculated as above are formed in the perforated board 11 which has the diameter R1=10 mm of the holes 12, the rate of hole area a $\alpha$=0.2, and the plate thickness t1=2 mm, transmission loss is shown by a curve LN1 in FIG. 5. That is, maximum transmission loss is detected around 1700 Hz, so that the noise level is extremely reduced.

In this manner, the frequency characteristic of transmission loss of the sound isolation plate 10 is tuned readily and properly only by adjusting the projection amount S1 of the cylindrical portions 13 properly. As a result, effective noise suppression is achieved.

In the structure shown in FIGS. 2 and 3, a curve LN2 in FIG. 5 shows a frequency characteristic of a comparative sample in which end portions of the cylindrical portions 13, 13 are closed. Various conditions for the comparative sample are set to be identical to those for the sound isolation plate 10 in the first embodiment, other than that the end portions of the cylindrical portions 13, 13 are closed. For instance, respective portions of the comparative sample are set to be identical in size to those of the sound isolation plate 10 in the first embodiment (R1=10 mm, $\alpha$1=0.2, t1=2 mm, S1=50 mm). It would be understood, by comparing the curve LN1 with the curve LN2, that transmission loss of the sound isolation plate 10 in the first embodiment is extremely improved rather than the comparative sample.

In the above example, the projection amount S1 of the cylindrical portions 13 has been set such that the peak frequency f0 of transmission loss coincides with the peak frequency f2 of the noise to be isolated. However, a center frequency f1 in the frequency bandwidth of the noise to be isolated may be used in place of the peak frequency f2. In this case, instead of above Eqs. (4) and (5), $$S1 = C/4f1 \quad (6)$$

$$L1 - t1 = C/4f1 \quad (7)$$

may be employed.

Second Embodiment

Figure 7:
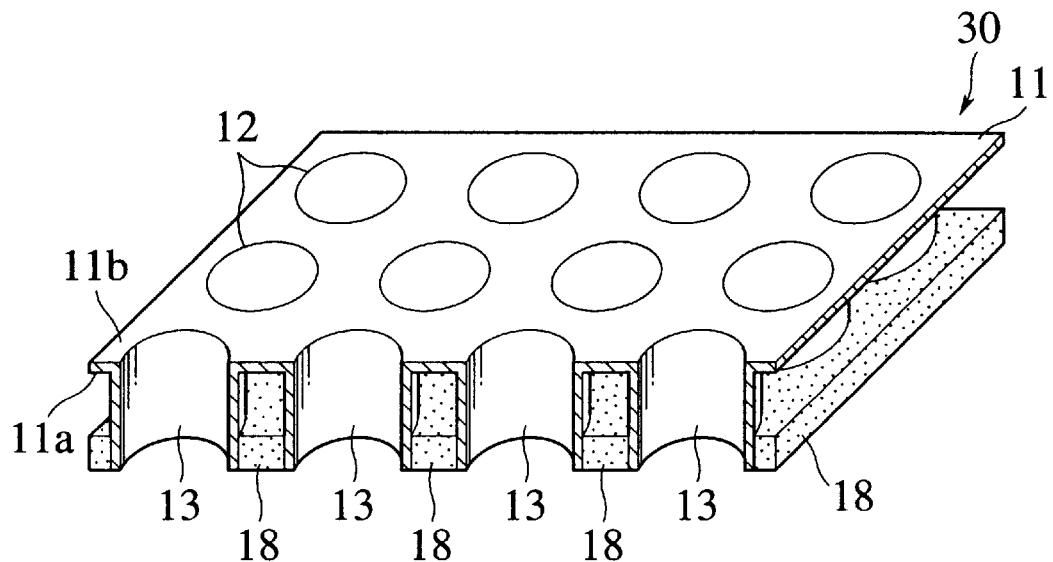
FIG. 7 is a perspective view showing a sound isolation plate structure according to a second embodiment of the present invention.
Figure 8:
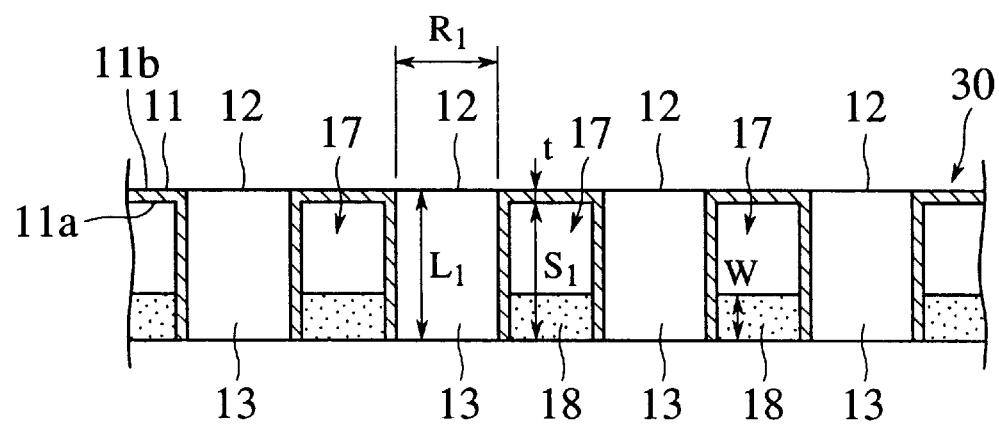
FIG. 8 is a sectional view showing a sectional shape of the sound isolation plate structure shown in FIG. 7.

FIGS. 7 and 8 show a sound isolation plate structure according to a second embodiment of the present invention.

In the sound isolation plate 30 according to the second embodiment of the present invention, porous material 18 such as wool material, cloth, soft cellular resin, etc. is filled between the cylindrical portions 13, 13 of the perforated board 11 which is constructed in the same manner as the first embodiment (see FIGS. 2 and 3).

The frequency characteristic of transmission loss of the sound isolation plate 30 is easily tuned by adjusting a filling factor $\rho$ or a filling thickness W of such porous material 18.

Figure 9:
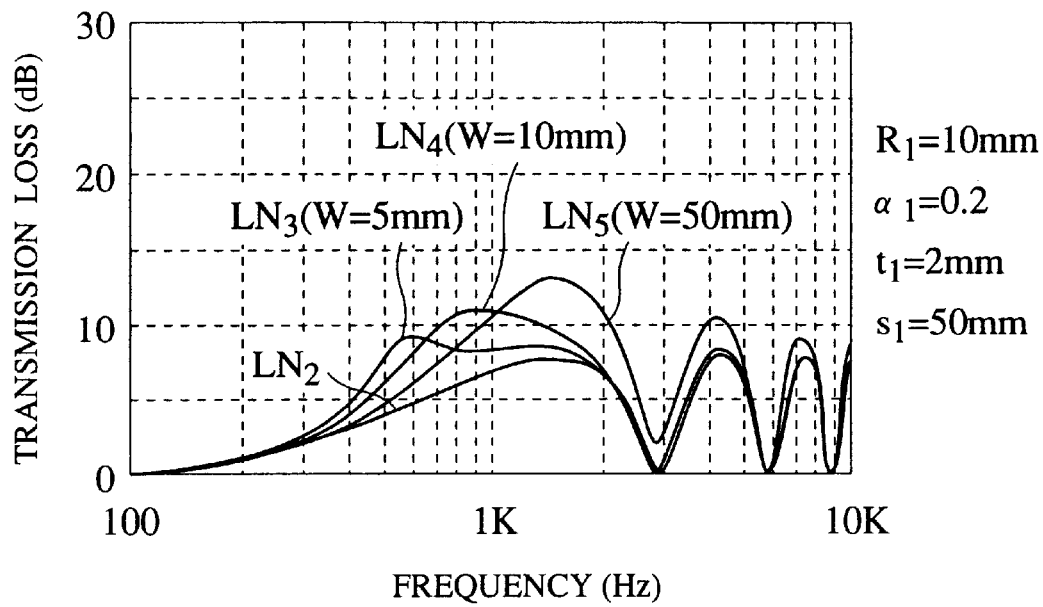
FIG. 9 is a graph showing a frequency characteristic of the sound isolation plate structure shown in FIG. 7.

For instance, as shown by curves LN3, LN4, LN5 in FIG. 9, the frequency characteristic of transmission loss is tuned by changing the filling thickness W into 5 mm, 10 mm, 50 mm respectively. Hence, if the filling thickness W is adjusted such that the peak frequency f0 of resultant transmission loss is in agreement with the center frequency or the peak frequency in the frequency bandwidth of the noise to be isolated, the noise is precisely shielded.

In addition, as evident from the characteristic view in FIG. 9, antiresonant peaks in the vibration response of the transmitted wave which is caused by the porous material 18 filled between the cylindrical portions 13, 13 are made relatively smooth. Further, if the sound isolation plate 30 is arranged such that one surface 11a side of the perforated board 11 from which the porous material 18 is exposed is directed toward a noise generating source side (or, when the sound isolation plate 30 is employed as the under cover of the engine room, the sound isolation plate 30 is arranged such that the porous material 18 is directed toward the engine room side), a noise absorbing effect is also obtained by the porous material 18. As a result, a noise level of the noise generating source side (incident wave side) of the sound isolation plate 30 is simultaneously reduced, so that the sound isolation effect is much more improved as the overall sound isolation plate 30.

Third Embodiment

Figure 10:
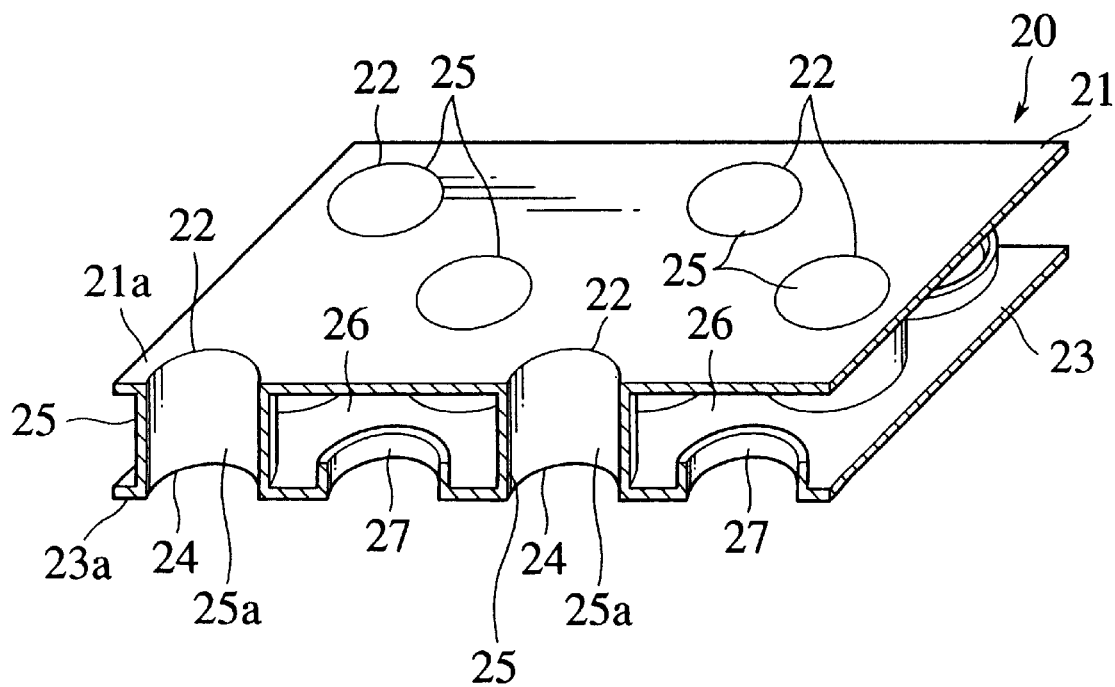
FIG. 10 is a perspective view showing a sound isolation plate structure according to a third embodiment of the present invention.
Figure 11:
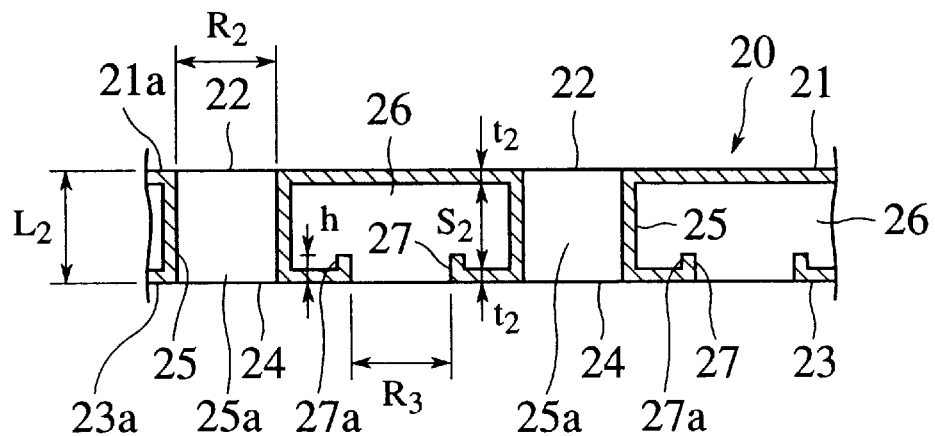
FIG. 11 is a sectional view showing a sectional shape of the sound isolation plate structure shown in FIG. 10.

FIGS. 10 and 11 show a sound isolation plate structure according to a third embodiment of the present invention.

The sound isolation plate 20 according to the third embodiment comprises two sheets of perforated boards 21, 23 made of resin. A plurality of holes 22, 24 of the same number are formed in the perforated boards 21, 23 respectively. All holes 22, 24 are formed as circular holes each having the same diameter R2. The perforated boards 21, 23 are positioned at a predetermined interval such that the holes 22, 24 are opposed to each other.

Peripheral portions of the opposing holes 22, 24 are connected via cylindrical portions 25 which are formed like cylinders respectively. Inner surfaces of the holes 22, 24 and inner surfaces of the cylindrical portions 25 are connected to form coplanar circular surfaces respectively. Cylindrical continuous holes 25a which continue from one surface 21a side of one perforated board 21 to one surface 23a side of the other perforated board 23 are partitioned with the holes 22, 24 and the cylindrical portions 25.

Air chambers 26 are formed between the neighboring cylindrical portions 25, 25. Circular opening portions 27 are formed on the other perforated board 23 to connect the air chambers 26 to the external space. Cylindrical portions 27a are projected from peripheral portions of the circular opening portions 27 into the air chambers 26 respectively. The circular opening portion 27 includes an inner surface of the cylindrical portion 27a and has a predetermined depth h.

Because of the holes 22, 24, a rate of hole area of each of the perforated boards 21, 23 is set to a predetermined value α1. Because of the circular opening portions 27, a rate of hole area of the perforated board 23 is set to a predetermined value β(α1+β<1).

Figure 12:
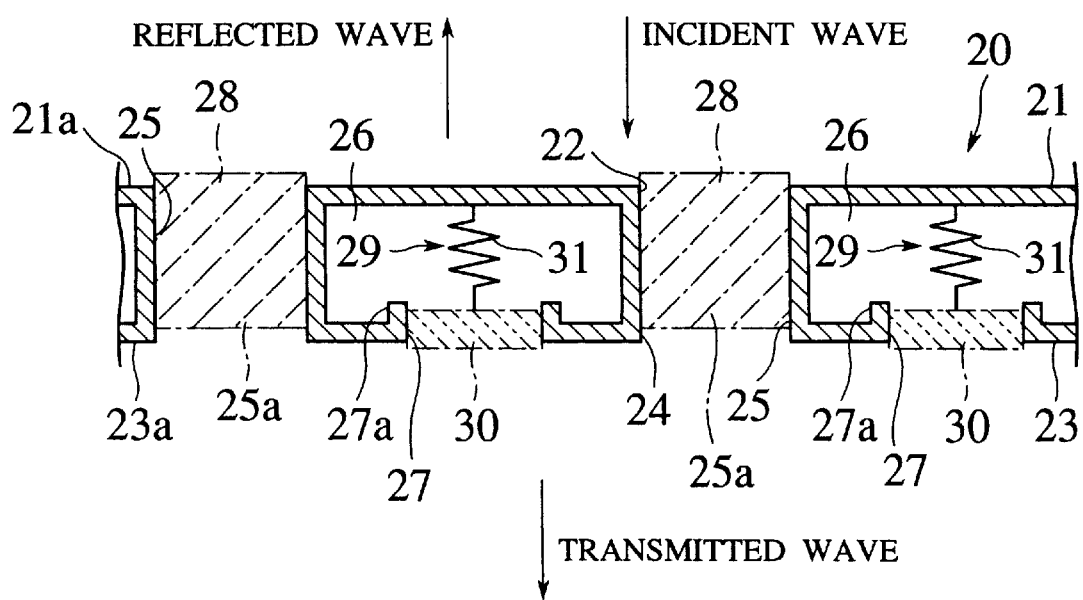
FIG. 12 is a sectional view showing a sound isolation mechanism of the sound isolation plate structure shown in FIG. 10.

FIG. 12 is a sectional view showing a sound isolation mechanism of the sound isolation plate 20.

Continuous holes 25a which are partitioned with the holes 22, 24 and the cylindrical portions 25 serve as pneumatic masses 28 respectively.

Pneumatic vibration systems 29 are formed in the air chambers 26. Each of such pneumatic vibration systems 29 consists of a pneumatic mass 30 which is made up of an air layer in the circular opening portion 27, and an air spring 31 which is made up of an air layer which is located inner (the perforated boards 21 side) than the circular opening portion 27.

Accordingly, in the third embodiment, these pneumatic vibration systems 29 act as dynamic dampers against the transmitted wave transmitted via the continuous holes 25a of the sound isolation plate 20 to thus provide antiresonance to a vibration response of the transmitted wave, so that transmission loss is improved and also a noise level is reduced. As a result, if used as the under cover provided on the bottom of the engine room of the car, the sound isolation plate 20 produces an remarkable effect.

While comparing with the above first embodiment, the third embodiment will be explained hereunder.

Figure 13:
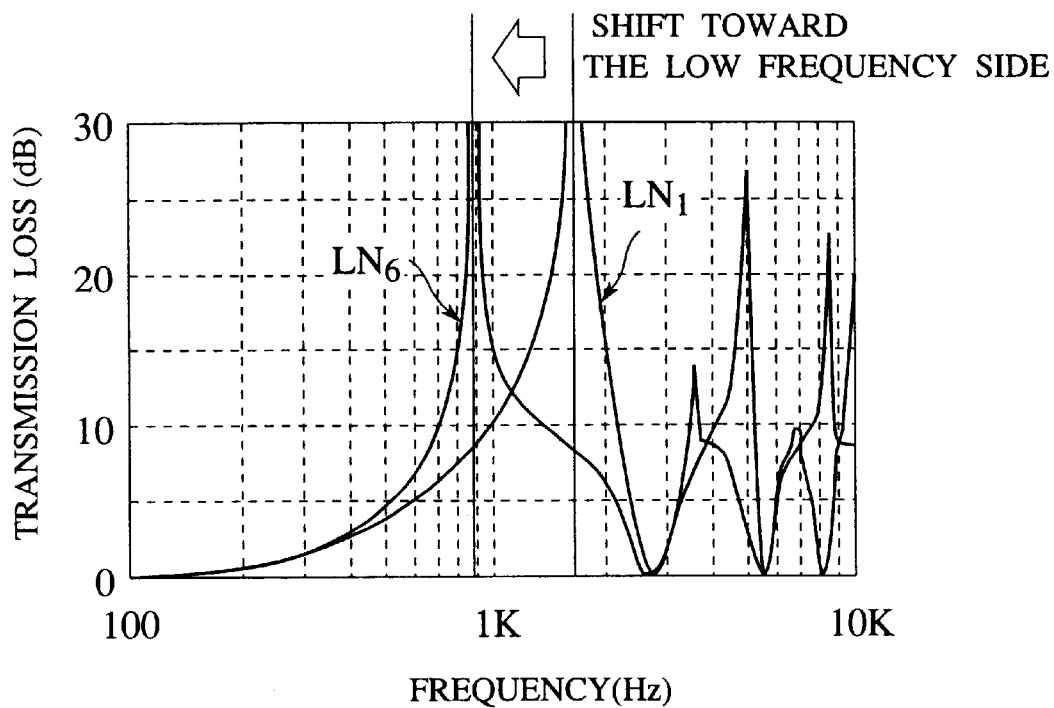
FIG. 13 is a graph showing a frequency characteristic of the sound isolation plate structure shown in FIG. 10.

In the third embodiment, a rate of hole area α2, diameters R2 of the holes 22, 24, thicknesses t2 of the perforated boards 21, 23, and an effective length (a total thickness of the sound isolation plate 20) L2 of the cylindrical portions 25 are set to be equal to those of the sound isolation plate 10 shown in FIGS. 1 and 2 (α1=α2, R1=R2, t1=t2, L1=L2). In this case, the peak frequency of transmission loss of the sound isolation plate 20 is indicted by a curve LN6 in FIG. 13, and such peak frequency of transmission loss is shifted to the lower frequency side than the peak frequency of transmission loss in the first embodiment indicated by the curve LN1. As a result, the third embodiment is effective for a case where the noise having the peak frequency on the lower frequency side is to be isolated.

Moreover, the peak frequency of transmission loss is tuned by adjusting any of the diameter R3 of the circular opening portion 27, the rate of hole area β, the depth h of the circular opening portion 27, the total length L2, and the height S2 of the air chamber, all being constituent elements of the vibration systems 29. Therefore, the noise is precisely shielded by putting the peak frequency of transmission loss into substantial agreement with the center frequency or the peak frequency of the frequency bandwidth of the noise to be isolated.

Fourth Embodiment

Figure 14:
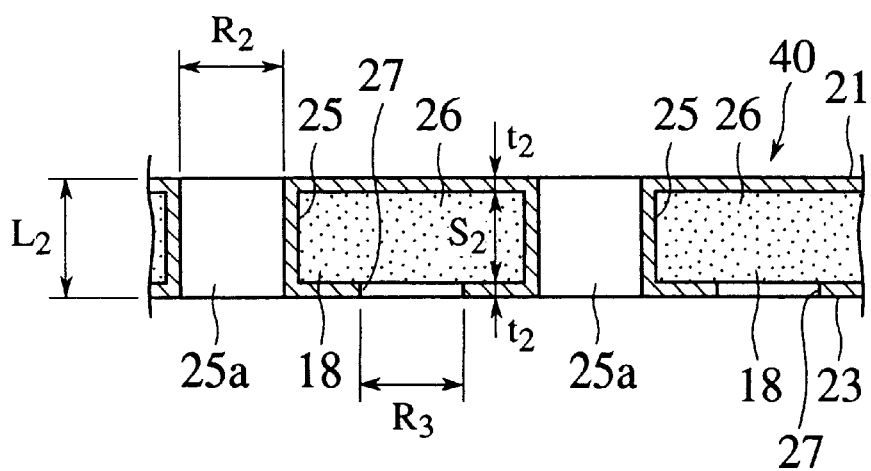
FIG. 14 is a perspective view showing a sound isolation plate structure according to a fourth embodiment of the present invention.

In a sound isolation plate 40 according to a fourth embodiment of the present invention shown in FIG. 14, the porous material 18, as used in the second embodiment, is filled in the air chamber 26 of the sound isolation plate 20 according to the third embodiment shown in FIGS. 10 and 11.

Therefore, in the case of this fourth embodiment, a frequency characteristic of transmission loss is tuned arbitrarily by adjusting the filling density ρ of the porous material 18, in addition to the diameter R3 of the circular opening portion 27 of the vibration system 29 acting as the dynamic damper, the rate of hole area β, the depth h of the circular opening portion 27, the total length L2, and the height S2 of the air chamber.

Figure 15:
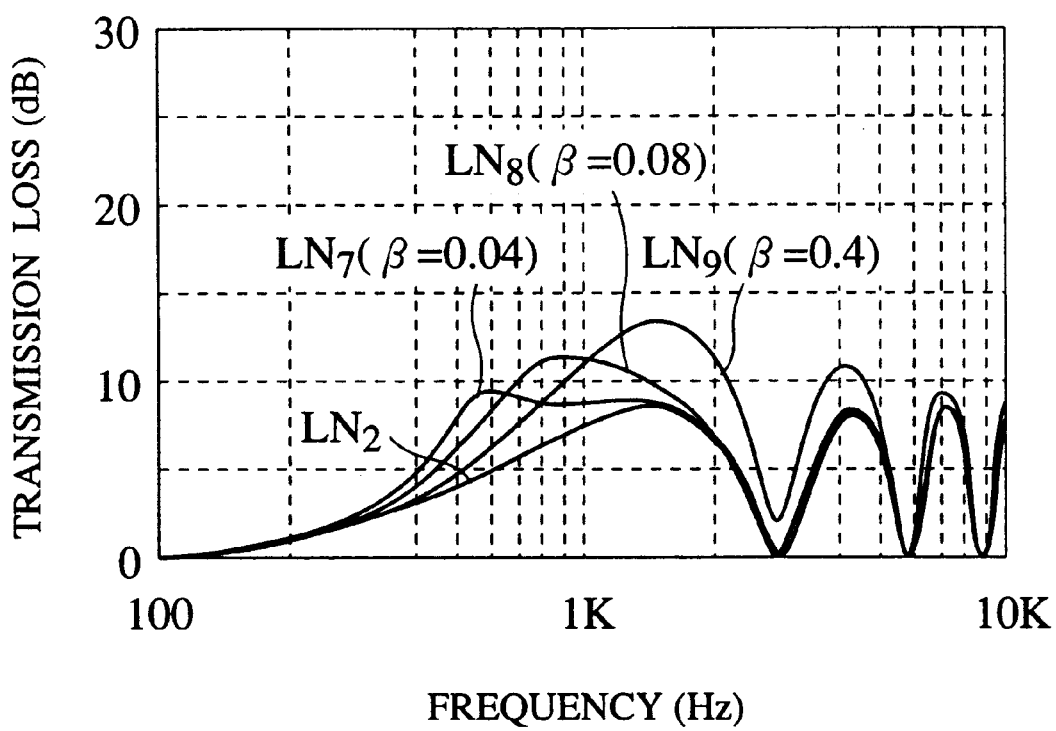
FIG. 15 is a view showing a frequency characteristic of the sound isolation plate structure shown in FIG. 14.

For instance, if the rate of hole area β of the circular opening portion 27 is changed into 0.04, 0.08, 0.4 respectively, the frequency characteristic of transmission loss is changed as indicated by curves LN7, LN8, LN9 in FIG. 15 respectively. If the peak frequency of transmission loss is brought into coincidence with the center frequency or the peak frequency of the frequency bandwidth of the noise to be isolated, the noise is precisely shielded.

Like the case of the above second embodiment, antiresonant peaks of the vibration response of the transmitted wave are also made smooth by filling the porous material 18 in the fourth embodiment. Further, if the sound isolation plate 40 is arranged such that the perforated board 23 on which the circular opening portions 27 are provided to expose the porous material 18 is directed toward the noise generating source side (or, such that the surface side from which the porous material 18 is exposed is directed toward the noise generating source), the noise absorbing effect is also obtained by the porous material 18. As a result, the noise level of the noise generating source side (incident wave side) of the sound isolation plate 40 is simultaneously reduced, so that the sound isolation effect is much more improved.

What is claimed is:

1. A sound isolation structure comprising:

a a single, flat perforated board in which a plurality of holes are exclusively formed; and a plurality of cylindrical pipe-like portions which extend from peripheral portions of the plurality of holes; wherein:

a diameter and a length of a bore defined by each of the pipe-like cylindrical portions are selected in conjunction with a thickness of the single, flat perforated board to define a plurality of first and second pneumatic vibration systems wherein the air which is located within each of the pipe-like cylindrical portions acts as a first mass, while a first portion of the air which is located adjacent the outer diameter of the pipe-like cylindrical portions acts as a second mass and a remaining second portion of the air which is located adjacent the outer diameter of the pipe-like cylindrical portions acts as a spring which is associated with the second mass.

2. A sound isolation structure according to claim 1, wherein:

the thickness t of the single, flat perforated board, an effective bore length L of each cylindrical pipe-like portion, an acoustic velocity C, and a center frequency f1 in a frequency bandwidth of a noise to be isolated are set to satisfy the relationship:

$$L-t=C/4f1.$$

3. A sound isolation structure according to claim 1, wherein:

the thickness t of the single, flat perforated board, an effective bore length L of each cylindrical pipe-like portion, an acoustic velocity C, and a peak frequency f2 of a noise to be isolated are set to satisfy the relationship:

$$L-t=C/4f1.$$

4. A sound isolation structure according to claim 1, wherein:

a porous material is disposed in a space between the cylindrical pipe-like portions.

5. A sound isolation structure according to claim 2, wherein:

a porous material is disposed in a space between the cylindrical pipe-like portions; a filling density and a filling thickness of the porous material being selected so that a peak frequency of transmission loss which varies with the filling density and a filling thickness of the porous material is set to coincide substantially with the center frequency in the frequency bandwidth of the noise to be isolated.

6. A sound isolation structure according to claim 3, wherein:

a porous material is disposed in a space between the cylindrical pipe-like portions; a filling density and a filling thickness of the porous material being selected so that a peak frequency of transmission loss which varies with the filling density and a filling thickness of the porous material is set to coincide substantially with the peak frequency of the noise to be isolated.

7. A sound isolation structure comprising:

first and second flat perforated boards in which a first plurality of first holes and a second plurality of second holes are respectively formed, each of the first plurality of first holes in the first perforated board being spaced from an adjacent hole by a first predetermined interval and arranged so as to be each opposite a second hole in the second flat perforate board; and a plurality of cylindrical portions, each of the cylindrical portions connecting one of the first holes with a second hole so as to provide a continuous un-interrupted communication therebetween, the number of second holes in the second board being greater than the number of first holes in the first board, the second holes being spaced from one another by a second predetermined interval which is less than the first predetermined interval by a predetermined amount so that a predetermined number of un-connected second holes open into an air chamber defined between the first and second boards and are entirely located opposite a non-perforate portion of the first board, so that pneumatic vibration systems are formed wherein air in each of the cylindrical portions acts as a first mass, while air which is located in each of the second un-connected holes and the air which is located above each of the second un-connected holes and within the air chamber defined between the first and second board, respectively act as a second mass and a spring associated with the second mass.

8. A sound isolation structure according to claim 7, wherein:

a peak frequency of transmission loss which varies with a diameter of the un-connected second holes which open into the air chamber, a rate of hole area of the un-connected second holes, a depth of an opening portion of the un-connected second holes, a total thickness of the sound insulation plate, and a thickness of the air chamber, is set to coincide with a center frequency of a frequency bandwidth of a noise to be isolated.

9. A sound isolation structure according to claim 7, wherein:

a peak frequency of transmission loss which varies with a diameter of the un-connected second holes which open into the air chamber, a rate of hole area of the un-connected second holes, a depth of an opening portion of the un-connected second holes, a total thickness of the sound insulation plate, and a height of the air chamber, is set to coincide with a peak frequency of a noise to be isolated.

10. A sound isolation structure according to claim 7, wherein a porous material is filled into the air chamber.

11. A sound isolation structure according to claim 7, wherein:.

a peak frequency of transmission loss which varies with a filling density of the porous material filled into the air chamber, a diameter of the un-connected second holes which open into the air chamber, a rate of hole area of the un-connected second holes, a depth of an opening portion of the un-connected second holes, a total thickness of the sound insulation plate, and a height of the air chamber, is set to coincide with a center frequency of a frequency bandwidth of a noise to be isolated.

12. A sound isolation structure according to claim 7, wherein:

a peak frequency of transmission loss which varies with a filling density of the porous material filled into the air chamber, a diameter of the un-connected second holes which open into the air chamber, a rate of hole area of the un-connected second holes, a depth of an opening portion of the un-connected second holes, a total thickness of the sound insulation plate, and a height of the air chamber, is set to coincide with a peak frequency of a noise to be isolated.

13. A sound isolation structure according to claim 6, wherein:

the sound isolating structure is oriented so that the porous material is exposed to a noise generating source.

14. A sound isolation structure according to claim 10, wherein:

the second perforated board in which the second openings are formed, is directed toward a source of noise so as to expose the porous material to the noise from the noise generating source via the un-connected second holes.

15. A sound isolation structure according to claim 7, wherein each of the second un-connected holes has a first diameter, and each of the second holes which is connected with a first holes by a cylindrical portion, has a second diameter.

16. A sound isolation structure according to claim 7, the first diameter, is one of the same and different from the second diameter.

17. A sound isolation structure according to claim 7, wherein each of the second un-connected holes has an inwardly extending flange having a given height which defines a depth of the opening portion thereof.

18. A sound isolation structure according to claim 4, wherein the porous filler is formed so as to partially fill the space defined adjacent the cylindrical pipe-like portions and to have a given thickness so that it is separated from the single, flat perforated board and defines an air filled space between the porous filler and the single, flat perforated board.

* * * * *